US011093843B2

(12) United States Patent
Gupta et al.

(10) Patent No.: US 11,093,843 B2
(45) Date of Patent: Aug. 17, 2021

(54) SELF-TRAINED CONTENT MANAGEMENT SYSTEM FOR AUTOMATICALLY CLASSIFYING EXECUTION MODES FOR USER REQUESTS

(71) Applicant: ADOBE INC., San Jose, CA (US)

(72) Inventors: Shashank Gupta, New Delhi (IN); Gaurav Gupta, Delhi (IN)

(73) Assignee: Adobe Inc., San Jose, CA (US)

( * ) Notice: Subject to any disclaimer, the term of this patent is extended or adjusted under 35 U.S.C. 154(b) by 909 days.

(21) Appl. No.: 15/825,782

(22) Filed: Nov. 29, 2017

(65) Prior Publication Data

US 2019/0164070 A1 May 30, 2019

(51) Int. Cl.
| | |
|---|---|
| *G06F 9/44* | (2018.01) |
| *G06N 5/04* | (2006.01) |
| *G06F 9/46* | (2006.01) |
| *G06F 9/50* | (2006.01) |
| *G06F 9/48* | (2006.01) |
| *G06N 20/00* | (2019.01) |

(52) U.S. Cl.
CPC ............ *G06N 5/046* (2013.01); *G06F 9/467* (2013.01); *G06F 9/4881* (2013.01); *G06F 9/5038* (2013.01); *G06N 20/00* (2019.01)

(58) Field of Classification Search
CPC .................................................... G06N 5/046
USPC .......................................................... 706/12
See application file for complete search history.

(56) References Cited

U.S. PATENT DOCUMENTS

| 6,609,247 B1* | 8/2003 | Dua ................... G06F 11/3636 712/227 |
| 2016/0187861 A1* | 6/2016 | Chen ................... G05B 13/027 700/40 |
| 2018/0248905 A1* | 8/2018 | Cote ....................... G06F 17/18 |

OTHER PUBLICATIONS

Amazon Web Services. (Aug. 2017). Auto Scaling. Retrieved from the Internet Feb. 28, 2018 at <https://web.archive.org/web/20170825074436/https://aws.amazon.com/autoscaling/>. 7 pages.
Trailhead. Asynchronous Processing Basics. Salesforce, Inc. Retrieved from the internet Feb. 28, 2018 at <https://web.archive.org/web/20180228171637/https://trailhead.salesforce.com/en/modules/asynchronous_apex/units/async_apex_introduction>. 6 pages.

* cited by examiner

*Primary Examiner* — Timothy A Mudrick
(74) *Attorney, Agent, or Firm* — Shook, Hardy & Bacon L.L.P.

(57) ABSTRACT

Embodiments of the present invention are directed to techniques for optimizing an execution mode used to process a request. A self-training storage system can determine one or more proposed execution modes based on a real-time evaluation of various factors, including a history of execution modes used to process historical requests. This history can serve as training data for a machine learning model that can predict an execution mode based on one or more request parameters. This predicted execution mode can be taken as one of a number of proposed execution modes that can be combined using a weightage system to automatically classify an ultimate execution mode used to process the request. Associated weights for combining proposed execution modes can be determined by training a machine learning model using a training set constructed based on a survey of user satisfaction with a determined execution mode.

20 Claims, 6 Drawing Sheets

SELF-TRAINED CONTENT MANAGEMENT SYSTEM FOR AUTOMATICALLY CLASSIFYING EXECUTION MODES FOR USER REQUESTS

BACKGROUND

In a typical content management system, users can send requests to a server to perform various tasks such as generating, editing, tracking, or managing remote content. User requests can be processed using any number of execution modes. For example, a synchronous execution mode can prevent a requesting user from taking further action in a corresponding user interface until a request has been fully processed, for example, by locking the user interface while a request is processing. An asynchronous execution mode, on the other hand, processes requests in the background, allows the requesting user to continue using the user interface, and can notify the user once a request has been fully processed. In another example, a batch execution mode batches user requests before they are processed. In yet another example, a scheduled execution mode schedules requests for processing at a later time. A queued execution mode places user requests in a queue for processing, normally in a first-in-first-out manner. In addition to these, various other execution modes are possible.

In conventional content management systems, user requests are processed using predefined execution modes. For example, in a particular system, a user request to move content from one location to another might always be processed using a synchronous execution mode. Similarly, a user request to trigger a workflow might always be processed asynchronously. As such, when a conventional system is heavily loaded and the system receives a request that requires significant system resources to process (e.g., a request to move 10,000 files), processing this request can significantly burden the already loaded system, leading to a very slow response time and an unsatisfactory user experience. The burden on the system can be compounded the more user requests it receives.

SUMMARY

Embodiments of the present invention are directed to dynamically optimizing an execution mode by using one or more models that can change over time. Generally, a self-training storage system is provided that determines an execution mode for a particular request. One or more proposed execution modes can be determined, for example, based on a real-time evaluation of one or more request parameters, one or more user policies, an instantaneous system load, a history of execution modes used to process historical requests, and other factors. By way of nonlimiting example, a self-training storage system can maintain a history of the execution mode used to process each request. This history can serve as training data for a supervised learning model. For example, the history can be used to generate a machine learning model that can predict an execution mode based on one or more request parameters. For a given request, the model can be used to predict an execution mode for the request. This predicted execution mode can be taken as one of a number of proposed execution modes.

Having determined one or more proposed execution modes, an ultimate execution mode can be determined based on the proposed execution modes. In some embodiments, a weightage system can be utilized to automatically classify the ultimate execution mode based on the proposed execution modes and associated weights. One weightage system might combine the proposed execution modes by encoding the proposed execution modes into a standard form, accessing weights for the proposed execution modes, and generating a variate that combines the encoded execution modes using the associated weights (e.g., with a weighted sum). This variate can be decoded to determine the ultimate execution mode for the request. Weights can be determined in various ways, for example, by training a machine learning model using a training set constructed based on a survey of user satisfaction with a determined execution mode. Additionally and/or alternatively, a defined priority order can be utilized to select one of the proposed execution modes as the ultimate execution mode for the request. The ultimate execution mode used to process a request along with associated request parameters can be added to a history, and the request can be processed using the determined execution mode.

The resulting self-training storage system makes intelligent decisions based on past experiences, resulting in a more efficient allocation of system resources, reduced wait times, and improved user satisfaction. As such, the self-training storage system user can efficiently and effectively optimize execution modes for requests.

BRIEF DESCRIPTION OF THE DRAWINGS

The present invention is described in detail below with reference to the attached drawing figures, wherein.

DETAILED DESCRIPTION

Overview

Figure 1:
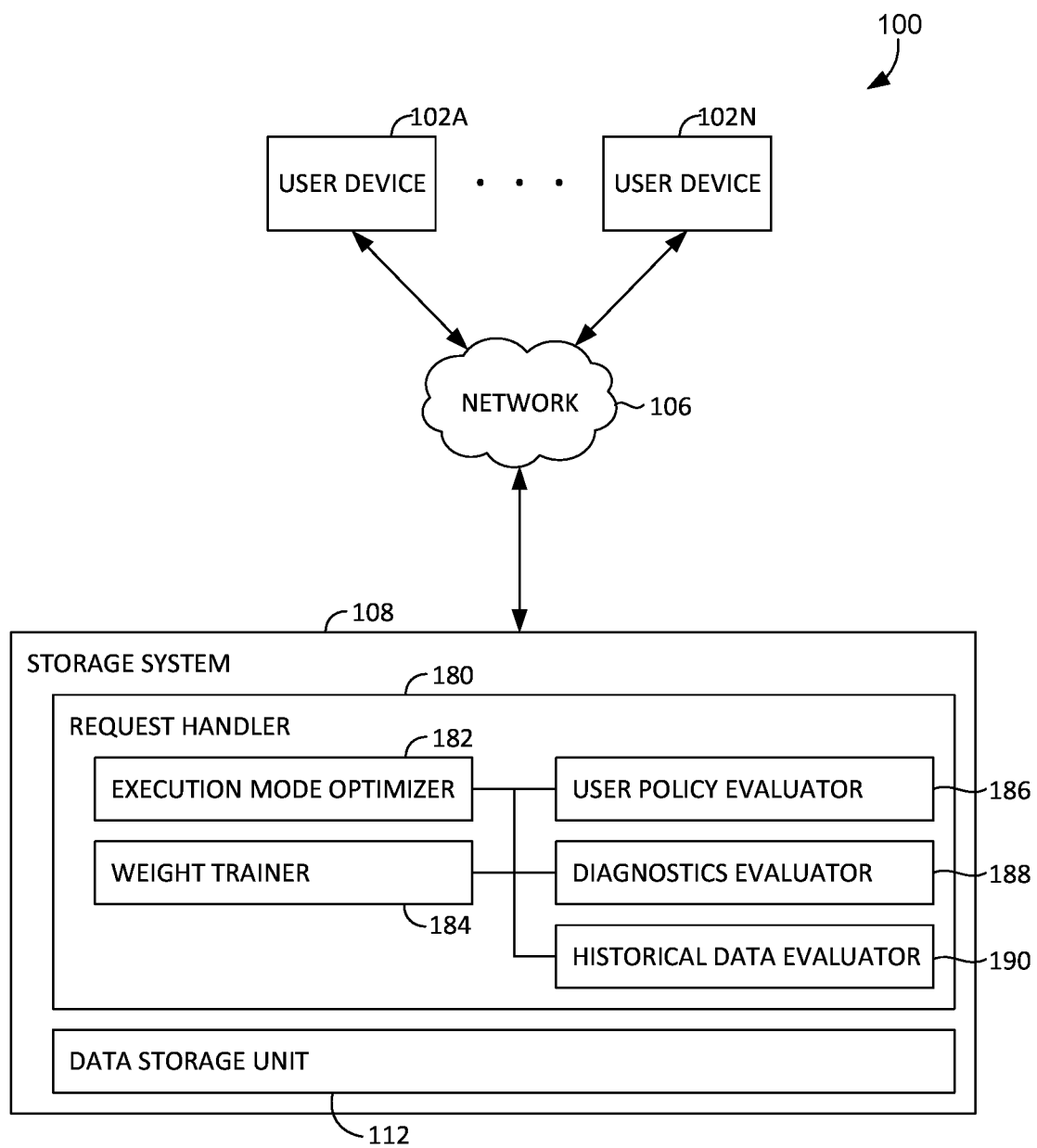
FIG. 1 is a block diagram of an exemplary computing system for automatically classifying an execution mode for user requests, in accordance with embodiments of the present invention.

Oftentimes, a user might desire to store data in a remote location using a storage system. For example, a user (e.g., a creative professionals or publisher) might desire to use creative tools of a content management system to generate, edit, track, or manage creative content. If a user subscribes, the content management system can provide various tools to permit the user to interact with the system. As such, the user can interact with a local device to initiate requests to generate, edit, track, or manage data (e.g., content) in a remote location, and a remote device (e.g., one or more servers) can receive and process these requests to perform corresponding operations on a data storage unit located remotely from the user. The manner in which user requests are processed impacts the system performance and user satisfaction.

User requests can be processed using any number of execution modes (e.g., synchronous, asynchronous, batch, scheduled, queued, etc.). In conventional systems such as conventional content management systems, user requests are processed using predefined execution modes. For example, a user request to upload content or move content from one location to another might always be processed using a synchronous execution mode. At a later time, an asynchronous process might be performed to extract metadata from the content so the content can be searched. In another example, a request to modify metadata for a large number of files (e.g., 10,000 files) might be processed asynchronously. In this sense, conventional systems utilize pre-defined execution modes for requests to generate, edit, track, or manage data (e.g., content).

In certain situations, a storage system might be heavily loaded. For example, system resources might be consumed by operations such as request processing to an extent that the storage system slows down. In these situations, processing an incoming user request can significantly burden an already loaded system, leading to a very slow response time and an unsatisfactory user experience. For example, assume a user interacts with a heavily loaded server using a user interface such as a web browser, and submits a request to move 250 files from one folder to another. If such a conventional storage system has designated move request to be processed using a synchronous execution mode, the user will have to wait for a response from the server to notify the user that a move has taken place. Often, the server can take minutes (or longer) to process a single request. In this situation, the user interface can lock up without any indication of how long the request will take to process. During this time, the user cannot perform any other operations using the interface, generally leading to an unsatisfactory user experience. The burden on the system can be compounded if the system receives requests from other users during this time.

Conventional systems that seek to address this problem have various shortcomings. For example, some storage systems increase server capacity by auto scaling, that is, by spawning additional virtual machines to handle an increased capacity. However, auto scaling requires additional resources to be available, which they may not be. Moreover, increasing server capacity by auto scaling increases the amount of resources utilized at a given time, thereby increasing the demands on a given system (e.g., power consumption, heat generation, etc.). Some storage systems can attempt to avoid heavy system loading by providing a user with the option of specifying an execution mode, for example, by permitting a user to make an asynchronous call. However, this approach will not prevent a user from initiating a synchronous request under heavy system loading. Accordingly, some users can still get locked out of a user interface using conventional storage systems.

Accordingly, embodiments of the present invention are directed to dynamically optimizing execution modes for user requests by using one or more models that can change over time. Generally, one or more proposed execution modes can be determined for a particular request, and the proposed execution modes can be utilized to determine an ultimate execution mode to process the request. Proposed execution modes can be determined in various ways, for example, based on a real-time evaluation of request parameters, one or more user policies, an instantaneous system load, a history of execution modes used to process historical requests, and other factors. By way of nonlimiting example, a self-training storage system can maintain a history of the execution mode used to process each request. This history can serve as training data for a supervised learning model. For example, the history can be used to generate a machine learning model that can predict an execution mode based on one or more request parameters. For a given request, the model can be used to predict an execution mode for the request. This predicted execution mode can be taken as one of a number of proposed execution modes.

The proposed execution modes can be utilized in various ways to determine an ultimate execution mode for the request. For example, a weightage system can be utilized to automatically classify an ultimate execution mode based on the proposed execution modes and associated weights. One weightage system might combine the proposed execution modes by encoding the proposed execution modes into a standard form, accessing weights for the proposed execution modes, and generating a variate that combines the encoded execution modes using the associated weights (e.g., with a weighted sum). This variate can be decoded to determine the ultimate execution mode for the request. Weights can be determined in various ways, for example, by training a machine learning model using a training set constructed based on a survey of user satisfaction with a determined execution mode. Other weightage systems can be implemented to automatically classify an ultimate execution mode for a request, for example, by using any type of neural network. Additionally and/or alternatively, a defined priority order can be utilized to select one of the proposed execution modes as the ultimate execution mode for the request. The ultimate execution mode determined for the request, along with associated request parameters, can be added to a history, and the request can be processed using the ultimate execution mode.

As such, using implementations described herein, a self-training storage system can efficiently and effectively optimize execution modes for user requests based on a real-time evaluation of request parameters, one or more user policies, an instantaneous system load, a history of execution modes used to process historical requests, and other factors. Further, a history of execution modes used to process historical requests can be used to generate a machine learning model that can predict an execution mode based on one or more request parameters. Various proposed execution modes can be evaluated to determine an execution mode, for example, using a weightage system to automatically classify an ultimate execution mode based on the proposed execution modes and associated learned weights. The resulting self-training storage system makes intelligent decisions based on past experiences, resulting in a more efficient allocation of system resources, reduced wait times, and improved user satisfaction.

Having briefly described an overview of aspects of the present invention, various terms used throughout this description are provided. Although more details regarding various terms are provided throughout this description, general descriptions of some terms are included below to provider a clearer understanding of the ideas disclosed herein:

A content management system generally refers to a storage system that facilitates generating, editing, tracking and/or managing creative content. A content management system can be implemented using one or more servers to which users (e.g., a creative professionals or publisher) can issue requests to generate, edit, track, or manage data (e.g., content) in a location remote to the user.

An execution mode generally refers to a method by which a request is processed (e.g., by a server). Example execution modes include synchronous, asynchronous, batch, scheduled, queued, and the like. A storage system may encode rules which determine the execution mode for a particular request.

A synchronous execution mode is an execution mode that prevents a requesting user from taking further action until a request has been fully processed, for example, by locking a user interface while a request is processing.

An asynchronous execution mode is an execution mode that processes requests in the background, allows the requesting user to continue using an associated user interface, and can notify the user once a request has been fully processed.

A weightage system generally refers to a system which predicts an outcome based on multiple inputs and associated weights. In a simple example, inputs {X1,X2,X3} can be added together (or combined in some other way) using associated weights {W1,W2,W3} using the equation W1*X1+W2*X2+W3*X3 to generate a variate which encodes the potential outcomes. In another example, inputs can be connected to a neural network, which can be trained to determine appropriate weights between nodes to produce an output which encodes the potential outcomes. Various other weighting systems will be understood by those of ordinary skill in the art.

Exemplary Execution Mode Optimization Environment

Referring now to FIG. 1, a block diagram of exemplary environment 100 suitable for use in implementing embodiments of the invention is shown. Generally, environment 100 is suitable for data management (e.g., digital content management), and, among other things, facilitates optimizing execution modes for user requests. Environment 100 includes any number of user devices 102A through 102N. User devices 102A through 102N can be any kind of computing device capable of initiating requests for storage system 108, such as requests to generate, edit, track or manage data (e.g., digital content) in data storage unit 112. In some embodiments, user devices 102A through 102N are computing devices such as computing device 600, as described below with reference to FIG. 6. In various embodiments, user devices 102A through 102N can be a personal computer (PC), a laptop computer, a workstation, a mobile computing device, a PDA, a cell phone, or the like.

Environment 100 includes storage system 108. Storage system 108 can be a content management system that manages digital content in data storage unit 112. In some embodiments, storage system 108 may correspond to creative apparatus 508 of FIG. 5. Storage system 108 can be any kind of computing device capable of receiving and processing requests from user devices 102A through 102N, such as requests to generate, edit, track or manage data (e.g., digital content) in data storage unit 112. Storage system 108 can be implemented using one or more servers, one or more platforms with corresponding application programming interfaces, cloud infrastructure and the like. Generally, the components of environment 100 may communicate with each other via network 106, which may include, without limitation, one or more local area networks (LANs) and/or wide area networks (WANs). Such networking environments are commonplace in offices, enterprise-wide computer networks, intranets, and the Internet.

In the embodiment illustrated in FIG. 1, storage system 108 includes request handler 180 and data storage unit 112, and request handler 180 includes execution mode optimizer 182, weight trainer 184, user policy evaluator 186, diagnostics evaluator 188 and historical data evaluator 190. Generally, storage system 108 receives or otherwise accesses a request (e.g., an incoming request, queued request, scheduled request, etc.), and request handler 180 determines an execution mode for the request (e.g., via execution mode optimizer 182). Request handler 180 can determine an execution mode for any kind of request. In embodiments that relate to content management, request handler 180 can determine an execution mode for various types of content requests including requests to upload, download, move, copy, delete and/or publish content, or otherwise generate, edit, track, or manage content. In a generalized scenario for any request, there may be x modes of execution available, denoted by the set E={E1,E2,E3 ... Ex}. Once an execution mode has been determined for a request, storage system 108 (e.g., request handler 180) processes the request using the determined execution mode and optionally sends a response to the requesting user.

Generally, request handler 180 determines an execution mode (e.g., using execution mode optimizer 182) based on a real-time evaluation of request parameters, one or more user policies, an instantaneous system load, a history of execution modes used to process historical requests and/or other factors. In some embodiments, execution mode optimizer 182 determines or otherwise accesses one or more proposed execution modes, each of which may be based on one or more individual factors. Execution mode optimizer 182 can determine an ultimate execution mode based on the proposed execution modes. In some embodiments, execution mode optimizer 182 dynamically optimizes the execution mode for a request by using one or more models that can change over time. For example, execution mode optimizer 182 can use a machine learning model to learn appropriate weights to combine proposed execution modes and/or individual factors. In this manner, execution mode optimizer 182 can make intelligent decisions based on past experiences, resulting in a more efficient allocation of system resources, reduced wait times, and improved user satisfaction.

In some embodiments, execution mode optimizer 182 can determine or otherwise access an execution mode (e.g., a proposed execution mode, an ultimate execution mode, etc.) based on one or more request parameters for a given request. In a generalized scenario, a request R can include a set of n request parameters P={P1,P2,P3 ... Pn}. Request parameters may vary depending on the type of request, and may include parameters such as a number of assets involved, number of nodes involved, inward reference count, outward reference count, size of the file(s) involved, role of the requesting user, origination locale of the request, or otherwise. In one example, execution mode optimizer 182 may determine or otherwise access a proposed execution mode for a request based on a threshold file size of 1 GB such that a synchronous execution mode is proposed for a request to move a file<1 GB and an asynchronous execution mode is proposed for a request to move a file>1 GB. In another example, execution mode optimizer 182 may invoke a preference for certain locales such that a synchronous execution mode is proposed for a request originating from one location (e.g., state, region, country, etc.), and an asynchronous execution mode is proposed for a request originating from another location. In another example, execution mode optimizer 182 may determine or otherwise access a proposed execution mode for a request based on the role of the requesting user. For example, execution mode optimizer 182 may propose a synchronous execution mode for requests generated by an administrator.

In some embodiments, request handler 180 (e.g., user policy evaluator 186 of request handler 180) can determine an execution mode (e.g., a proposed execution mode, an ultimate execution mode, etc.) based on one or more user policies. User policies may be defined by a user, a system administrator, a combination thereof, or otherwise. In one embodiment, user policy evaluator 186 can access one or more defined user policies comprising one or more rules for determining an execution mode for a request. The rules can be defined with conditions based on one or more request parameters. For a given request to be processed, the request is evaluated to determine the relevant request parameters, and an execution mode is determined by applying the one or more rules to the determined request parameters.

User policies can enumerate thresholds for request parameter values. In a generalized scenario for a request R with a set of n request parameters P={P1,P2,P3 . . . Pn}, a user policy can be denoted by an m-tuple U={U1,U2,U3 . . . Um} consisting of one or more request parameters identifiers, corresponding request parameter values that define the conditions under which a specific execution mode should be selected, and the corresponding execution mode for when the conditions are satisfied. As such, user policy evaluator 186 can determine an execution mode for a request based on one or more user policies defined by a corresponding m-tuple. In some embodiments, the user policies can be modified. For example, new tuples can be added, existing tuples can be modified or deleted, and the like. An example pseudo-code that user policy evaluator 186 can utilize to determine an execution mode is given as follows:

```
Det_mode(req){
    C get policies for req.type
    Mode := -1
    For each tuple t in C do
        Mode := evaluate(req, t) // evaluate mode using m-tuple
            user policy t
        If (mode != -1)
            Break; //mode has been determined using one of the
                policies
    End for
    If (mode != -1)
        Mode :=E1 // use default mode if none of the user policies
            is satisfied
    End if
}
```

By way of nonlimiting example, consider a MOVE request to move nodes from one part of a repository tree (e.g., JCR tree) to another. Let us define the request parameter set as:

*P*={num_of_nodes,inward_ref_count,outward_ref_count}

Now, let us define user policies as a set of tuples:

*Ua*={num_of_nodes,10,inward_ref_count,20,outward_ref_count,20,*E*1}

*Ub*={num_of_nodes,100,inward_ref_count,50,outward_ref_count,50,*E*2}

Now, consider an incoming request R with request parameter values:

*Pr*={num_of_nodes=5,inward_ref_count=1,outward_ref_count=10}

For this request, the method det_mode( ) will return the E1 execution mode because the values of the request parameters Pr satisfies the user policy Ua. In another example, a request with parameter values:

*Pr*={num_of_nodes=90,inward_ref_count=10,outward_ref_count=15} will evaluate to the E2 execution mode.

As such, user policy evaluator 186 can determine an execution mode based on one or more user policies. Let us label the execution mode determined based on user policies as M1.

In some embodiments, request handler 180 (e.g., diagnostics evaluator 188 of request handler 180) can determine an execution mode (e.g., a proposed execution mode, an ultimate execution mode, etc.) based on the instantaneous loading of storage system 108. For example, when a request arrives, the system may be heavily loaded, and it may make sense to schedule the request for execution at a later point in time. Generally, various system characteristics may be evaluated to assess the instantaneous system loading, such as CPU utilization, memory utilization, I/O utilization, bandwidth utilization, or some other performance metric, whether alone or in combination. As such, diagnostics evaluator 188 can determine or otherwise access an instantaneous system load. Based on the instantaneous system load, diagnostics evaluator 188 can determine or otherwise access a system capacity (e.g., for any or all of the system characteristics), and compare the system capacity to the instantaneous system load to determine an available system capacity. For a given request to be processed, the request can be evaluated along with the available system capacity to determine whether available system capacity is sufficient to process the request, as would understood by those of ordinary skill in the art. As such, an execution mode can be determined based on the determination of whether there is available system capacity to process the request. Let us label the execution mode determined based on the instantaneous system load as M2.

In some embodiments, request handler 180 (e.g., historical data evaluator 190 of request handler 180) can determine an execution mode (e.g., a proposed execution mode, an ultimate execution mode, etc.) based on a history of execution modes, for example, stored in data storage unit 112. For example, the history may include historical data such as one or more proposed execution modes for a request, the ultimate execution mode used to process the request, associated request parameters, and the like. Generally, historical data evaluator 190 can generate a machine learning model, using the historical data as a training set, to predict an execution mode based on one or more request parameters. Various machine learning models can be implemented to model the history, as would be understood by those of ordinary skill in the art. For example, a machine learning model can use a regression analysis (e.g., linear, logarithmic, polynomial, exponential, logistic, etc.), a decision tree, a classifier, a support vector machine, or other technique to predict an execution mode based on one or more request parameters. Generally, any model can be implemented using any type of analysis capable of evaluating one or more request parameters substantially in real-time.

For a given request to be processed, the request can be evaluated to determine the relevant request parameters, and an execution mode can be predicted using the model and the request parameters for the request. The ultimate execution mode used to process the request can be stored in the history along with associated request parameters, and the model can be updated based on the new data. This process can occur iteratively over multiple requests to refine the model as new data comes in. As such, the model can be seen as self-training and self-learning.

To illustrate one example self-training model that can learn from historical data, consider a model that uses a linear regression analysis with a single input attribute (e.g., a request parameter) P to predict an execution mode for a particular request. This model is meant merely as an example, and other models can be implemented (e.g., based on multiple input attributes). To continue with the example self-training model, assume four execution modes which can be encoded using the following encoding scheme: {E1=0; E2=1; E3=2; E4=3}. Any encoding scheme may be implemented, as would be understood by those of ordinary skill in the art. Table 1 illustrates a possible history of requests and corresponding execution modes and values of P, where P corresponds to a number of nodes associated with a request (e.g., a request to move P nodes).

TABLE 1

| Request | P | Execution Mode |
|---------|------|----------------|
| R1 | 100 | 2 |
| R2 | 128 | 2 |
| R3 | 64 | 1 |
| R4 | 32 | 1 |
| R5 | 1000 | 3 |
| R6 | 9999 | 3 |
| R7 | 89 | 1 |
| R8 | 5 | 0 |
| R9 | 110 | 2 |
| R10 | 1 | 0 |

The history in Table 1 can be modeled, for example, using a linear regression analysis to fit a line to the historical data, as would be understood by those of ordinary skill in the art. In this example, a linear regression analysis can be used to generate the following equation to predict an execution mode based on the encoded request parameter P:

$$\text{Execution mode} = 0.00017 * P + 1.304 \quad (1)$$

Consider an incoming request with P=56. An execution mode for this request can be determined using Eq. 1 to generate an encoded execution mode of 1.31351. The encoded execution mode can be rounded (e.g., down to 1) and decoded based on the encoding scheme to generate an execution mode, here, E2 for this request.

As such, historical data evaluator 190 can determine an execution mode based on a history of execution modes using a machine learning model. Let us label the mode of execution determined based on the history of execution modes as M3.

Each of the above example execution modes M1, M2 and M3 can be taken as proposed execution modes. These proposed execution modes are meant merely as examples, and other proposed execution modes may be implemented based on similar or other factors, individually or in combination. Having determined or otherwise accessed one or more proposed execution modes, request handler 180 (e.g., execution mode optimizer 182) can determine an ultimate execution mode to process a request based on the proposed execution modes. The proposed execution modes can be utilized in various ways to determine an ultimate execution mode for the request. For example, a weightage system can be utilized to automatically classify the ultimate execution mode based on the proposed execution modes and associated weights. Additionally and/or alternatively, a defined priority order can be utilized to select one of the proposed execution modes as the ultimate execution mode for the request. For example, at some point, if the priority order is M3>M1>M2, then M3 will be determined to be the ultimate execution mode for the request. As such, the ultimate execution mode determined for a request along with associated request parameters can be added to a history, and the request can be processed using the determined execution mode.

In some embodiments, execution mode optimizer 182 can implement a weightage system to automatically classify an ultimate execution mode based on the proposed execution modes and associated weights. Any kind of weightage system can be implemented, as would be understood by those of ordinary skill in the art. For example, one weightage system might combine the proposed execution modes by encoding the execution modes into a standard form, accessing associated weights (e.g., from weight trainer 184), and generating a variate that combines the encoded execution modes using the associated weights (e.g., with a weighted sum such as $W1*X1+W2*X2+W3*X3$). The variate can be rounded and decoded to determine the ultimate execution mode for the request. Other weighting systems can be implemented to automatically classify the ultimate execution mode for a request, for example, using various neural networks.

Weights can be determined in various ways. For example, weight trainer 184 may automatically learn appropriate weights by implementing a machine learning model. A training set can be constructed based on a survey of user satisfaction with a determined execution mode. For example, weight trainer 184 can prompt a requesting user to provide an indication of user satisfaction with a determined execution mode. The user's response can be transmitted to storage system 108, and weight trainer 184 can construct a training set using the indication of user satisfaction to determine a target outcome. For example, if the user was not satisfied with an asynchronous execution mode, weight trainer 184 can use a synchronous execution mode as the target outcome. Any variation for determining a target outcome based on an indication of user satisfaction can be implemented. Accordingly, weight trainer 184 can determine weights for associated execution modes by training a machine learning model using the training set. This process can occur iteratively over multiple requests to refine the weights as new data comes in. As such, weight trainer 184 can determine appropriate weights for execution mode optimizer 182 to use to automatically classify the ultimate execution mode.

Accordingly, the self-training storage system described herein can dynamically optimize an execution mode by using one or more models that can change over time. Given the same set of input conditions, the self-training storage system can automatically learn to choose different execution modes based on historical data and/or a survey of user satisfaction with an execution mode used to process a request. As such, the self-training storage system can learn to heal itself over time by changing the execution mode assigned to a particular set of input conditions. In one example, the system might learn over time that a request involving a particular file size (e.g., 1 GB) under a particular system load (e.g., 50%) should be processed using an asynchronous execution mode, instead of a synchronous execution mode. In this manner, the system can automatically learn to avoid heavy system loading. As such, the self-training storage system makes intelligent decisions based on past experiences, resulting in a more efficient allocation of system resources, reduced wait times, and improved user satisfaction.

Exemplary Flow Diagrams

Figure 2:
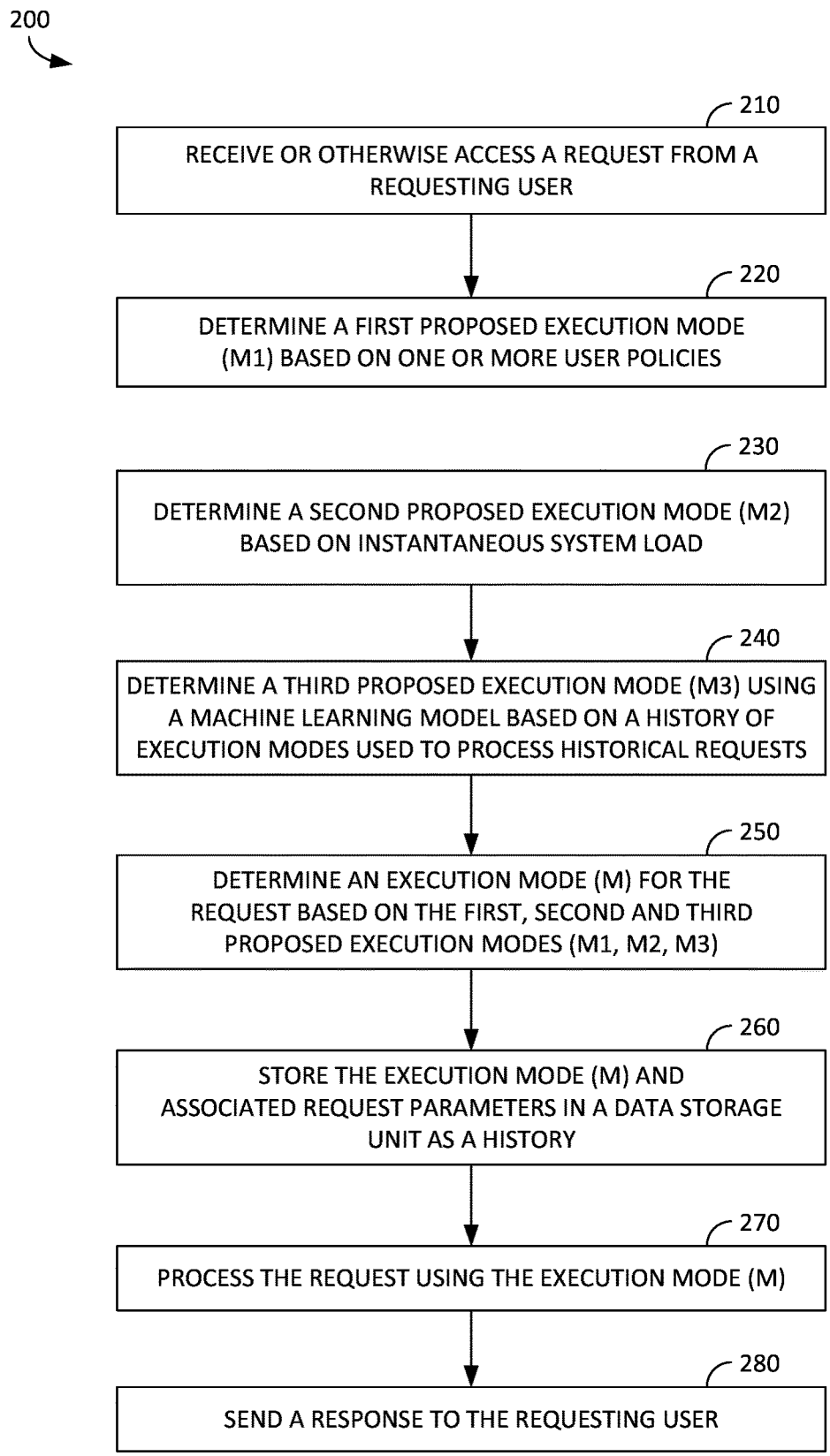
FIG. 2 is a flow diagram showing a method for optimizing an execution mode for user requests, in accordance with embodiments of the present invention.
Figure 3:
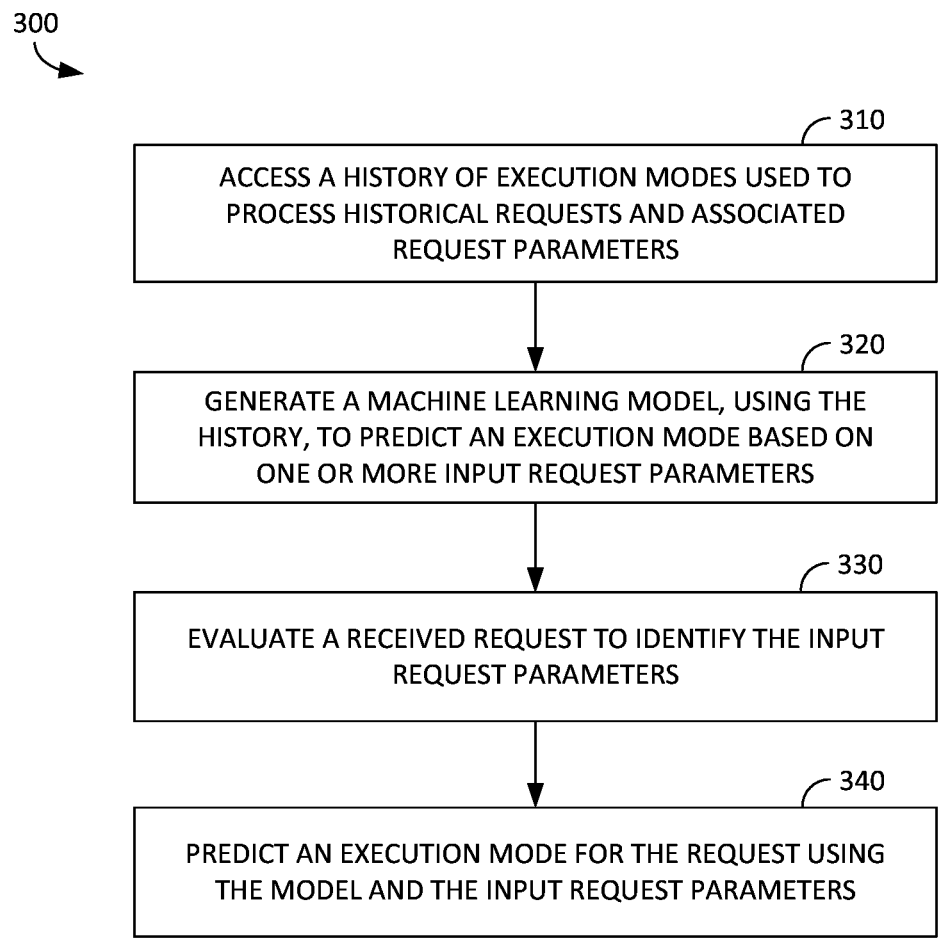
FIG. 3 is a flow diagram showing a method for predicting an execution mode based on a history of execution modes, in accordance with embodiments of the present invention.
Figure 4:
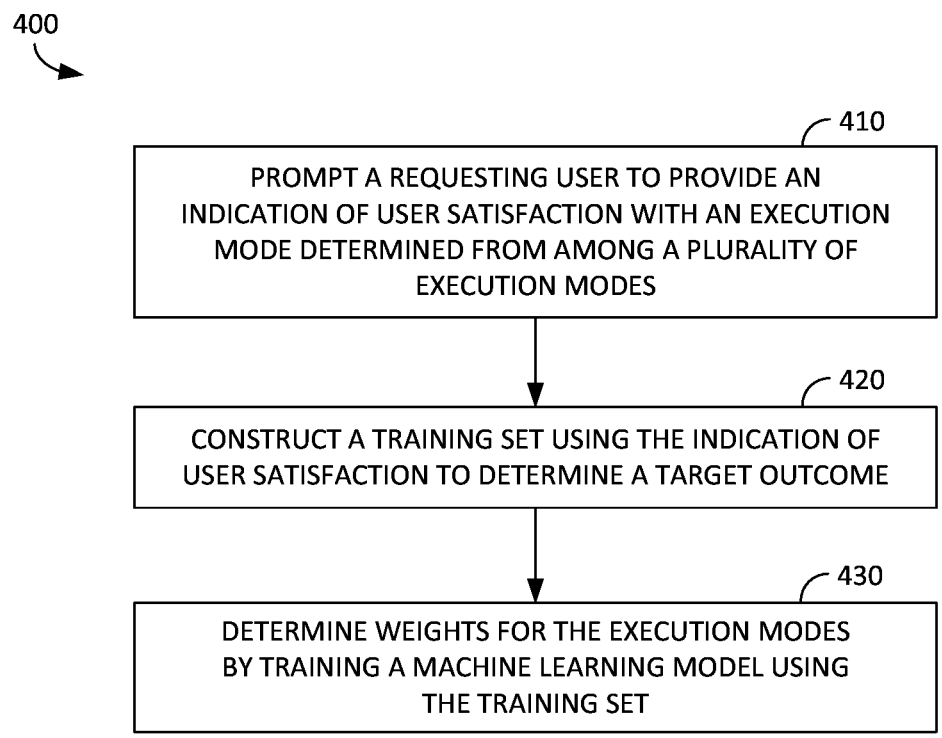
FIG. 4 is a flow diagram showing a method for determining weights for combining execution modes in a weightage system, in accordance with embodiments of the present invention.

With reference now to FIGS. 2-4, flow diagrams are provided illustrating methods for optimizing execution modes for user requests. Each block of the methods 200, 300 and 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 2, FIG. 2 illustrates a method 200 for optimizing an execution mode for user requests, in accordance with embodiments described herein. Initially at block 210, a request from a requesting user is received or otherwise accessed. At block 220, a first proposed execution mode (M1) is determined based on one or more user policies. At block 230, a second proposed execution mode (M2) is determined based on an instantaneous system load. At block 240, a third proposed execution mode (M3) is determined using a machine learning model based on a history of execution modes used to process historical requests. At block 250, an execution mode (M) is determined for the request based on the first, second and third proposed execution modes (M1, M2, M3). At block 260, the execution mode (M) and associated request parameters are stored in a data storage unit as a history. At block 270, the request is processed using the execution mode (M). At block 280, a response is sent to the requesting user indicating that the request has been processed.

Turning now to FIG. 3, FIG. 3 illustrates a method 300 for predicting an execution mode based on a history of execution modes, in accordance with embodiments described herein. In some embodiments, method 300 can correspond to block 240 of FIG. 2. Initially at block 310, a history of execution modes used to process historical requests and associated request parameters are accessed. At block 320, a machine learning model is generated, using the history, to predict an execution mode based on one or more input request parameters. At block 330, a received request is evaluated to identify the input request parameters. At block 340, an execution mode is predicted for the request using the model and the input request parameters.

Turning now to FIG. 4, FIG. 4 illustrates a method 400 for determining weights for combining execution modes in a weightage system, in accordance with embodiments described herein. Initially at block 410, a requesting user is prompted to provide an indication of user satisfaction with an execution mode determined from a plurality of execution modes. At block 420, a training set is constructed using the indication of user satisfaction to determine a target outcome. At block 430, weights are determined for the execution modes by training a machine learning model using the training set.

Exemplary Computing Environment

Figure 5:
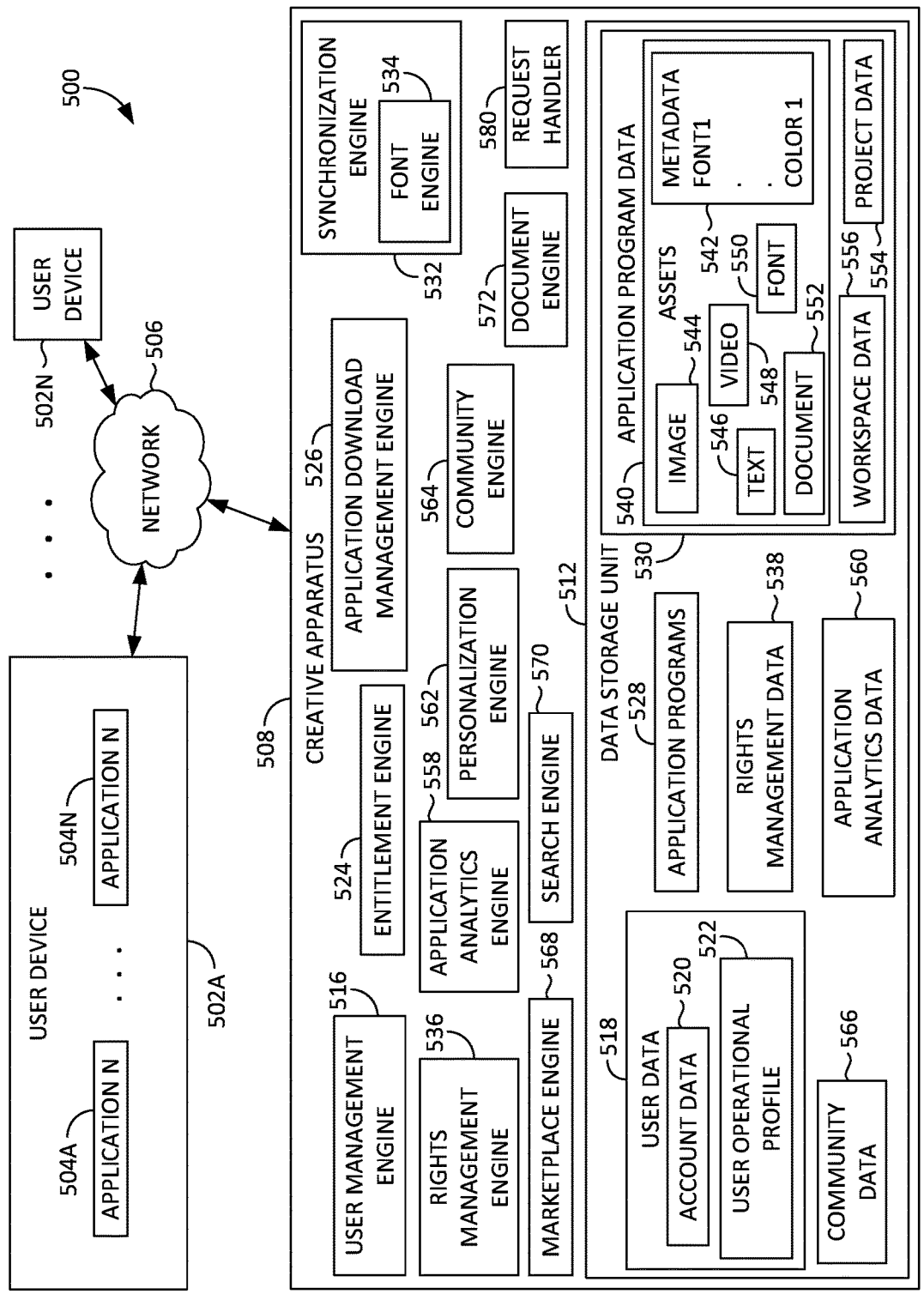
FIG. 5 is a block diagram of an exemplary computing environment in which embodiments of the invention may be employed.

FIG. 5 is a diagram of environment 500 in which one or more embodiments of the present disclosure can be practiced. Environment 500 includes one or more user devices, such as user devices 502A-502N. Examples of user devices include, but are not limited to, a personal computer (PC), tablet computer, a desktop computer, cellular telephone, a processing unit, any combination of these devices, or any other suitable device having one or more processors. Each user device includes at least one application supported by creative apparatus 508. It is to be appreciated that following description may generally refer to user device 502A as an example and any other user device can be used.

A user of the user device can utilize various products, applications, or services supported by creative apparatus 508 via network 506. User devices 502A-502N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 508.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 502A-502N can be connected to creative apparatus 508 via network 506. Examples of network 506 include, but are not limited to, internet, local area network (LAN), wireless area network, wired area network, wide area network, and the like.

Creative apparatus 508 includes one or more engines for providing one or more digital experiences to the user. Creative apparatus 508 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 508 also includes data storage unit 512. Data storage unit 512 can be implemented as one or more databases or one or more data servers. Data storage unit 512 includes data that is used by the engines of creative apparatus 508. Creative apparatus 508 also includes request handler 580. Generally, request handler 580 can optimize an execution mode for any type of user request.

A user of user device 502A visits a webpage or an application store to explore applications supported by creative apparatus 508. Creative apparatus 508 provides the applications as a software as a service (SaaS), or as a standalone application that can be installed on user device 502A, or as a combination. The user can create an account with creative apparatus 508 by providing user details and also by creating login details. Alternatively, creative apparatus 508 can automatically create login details for the user in response to receipt of the user details. In some embodiments, the user is also prompted to install an application manager. The application manager enables the user to manage installation of various applications supported by creative apparatus 508 and also to manage other functionalities, such as updates, subscription account and the like, associated with the applications. User details are received by user management engine 516 and stored as user data 518 in data storage unit 512. In some embodiments, user data 518 further includes account data 520 under which the user details are stored.

The user can either opt for a trial account or can make payment based on type of account or subscription chosen by the user. Alternatively, the payment can be based on product or number of products chosen by the user. Based on payment details of the user, user operational profile 522 is generated by entitlement engine 524. User operational profile 522 is stored in data storage unit 512 and indicates entitlement of the user to various products or services. User operational profile 522 also indicates type of user, i.e. free, trial, student, discounted, or paid.

In some embodiment, user management engine 516 and entitlement engine 524 can be one single engine performing the functionalities of both the engines.

The user can then install various applications supported by creative apparatus 508 via an application download management engine 526. Application installers or application programs 528 present in data storage unit 512 are fetched by application download management engine 526 and made available to the user directly or via the application manager. In one embodiment, an indication of all application programs 528 are fetched and provided to the user via an interface of the application manager. In another embodiment, an indication of application programs 528 for which the user is eligible based on user's operational profile are displayed to the user. The user then selects application programs 528 or the applications that the user wants to download. Application programs 528 are then downloaded on user device 502A by the application manager via the application download management engine 526. Corresponding data regarding the download is also updated in user operational profile 522. Application program 528 is an example of the digital tool. Application download management engine 526 also manages the process of providing updates to user device 502A.

Upon download, installation and launching of an application program, in one embodiment, the user is asked to provide the login details. A check is again made by user management engine 516 and entitlement engine 524 to ensure that the user is entitled to use the application program. In another embodiment, direct access is provided to the application program as the user is already logged into the application manager.

The user uses one or more application programs 504A-504N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 530 in data storage unit 512 by synchronization engine 532. Alternatively or additionally, such data can be stored at the user device, such as user device 502A.

Application program data 530 includes one or more assets 540. Assets 540 can be a shared asset which the user wants to share with other users or which the user wants to offer on a marketplace. Assets 540 can also be shared across multiple application programs 528. Each asset includes metadata 542. Examples of metadata 542 include, but are not limited to, font, color, size, shape, coordinate, a combination of any of these, and the like. In addition, in one embodiment, each asset also includes a file. Examples of the file include, but are not limited to, image 544, text 546, video 548, font 550, document 552, a combination of any of these, and the like. In another embodiment, an asset only includes metadata 542.

Application program data 530 also include project data 554 and workspace data 556. In one embodiment, project data 554 includes assets 540. In another embodiment, assets 540 are standalone assets. Similarly, workspace data 556 can be part of project data 554 in one embodiment while it may be standalone data in other embodiment.

A user can operate one or more user device to access data. For example, user device 502A can initiate a request to generate, edit, track, or manage data (e.g., content). Request handler 580 (which may correspond to request handler 180 in FIG. 1) can optimize an execution mode for the user request, as described herein. In this regard, application program data 530 is accessible by a user from any device, including a device which was not used to create assets 540. This is achieved by synchronization engine 532 that stores application program data 530 in data storage unit 512 and enables application program data 530 to be available for access by the user or other users via any device. Before accessing application program data 530 by the user from any other device or by any other user, the user or the other user may need to provide login details for authentication if not already logged in. In some cases, if the user or the other user are logged in, then a newly created asset or updates to application program data 530 are provided in real time. Rights management engine 536 is also called to determine whether the newly created asset or the updates can be provided to the other user or not. Workspace data 556 enables synchronization engine 532 to provide a same workspace configuration to the user on any other device or to the other user based on rights management data 538.

In various embodiments, various types of synchronization can be achieved. For example, the user can pick a font or a color from user device 502A using a first application program and can use the font or the color in a second application program on any other device. If the user shares the font or the color with other users, then the other users can also use the font or the color. Such synchronization generally happens in real time. Similarly, synchronization of any type of application program data 530 can be performed.

In some embodiments, user interaction with applications 504 is tracked by application analytics engine 558 and stored as application analytics data 560. Application analytics data 560 includes, for example, usage of a tool, usage of a feature, usage of a workflow, usage of assets 540, and the like. Application analytics data 560 can include the usage data on a per user basis and can also include the usage data on a per tool basis or per feature basis or per workflow basis or any other basis. Application analytics engine 558 embeds a piece of code in applications 504 that enables the application to collect the usage data and send it to application analytics engine 558. Application analytics engine 558 stores the usage data as application analytics data 560 and processes application analytics data 560 to draw meaningful output. For example, application analytics engine 558 can draw an output that the user uses "Tool 4" a maximum number of times. The output of application analytics engine 558 is used by personalization engine 562 to personalize a tool menu for the user to show "Tool 4" on top. Other types of personalization can also be performed based on application analytics data 560. In addition, personalization engine 562 can also use workspace data 556 or user data 518 including user preferences to personalize one or more application programs 528 for the user.

In some embodiments, application analytics data 560 includes data indicating status of a project of the user. For example, if the user was preparing an article in a digital publishing application and what was left was publishing the prepared article at the time the user quit the digital publishing application, then application analytics engine 558 tracks the state. Now when the user next opens the digital publishing application on another device, then the user is indicated and the state and options are provided to the user for publishing using the digital publishing application or any other application. In addition, while preparing the article, a recommendation can also be made by synchronization engine 532 to incorporate some of other assets saved by the user and relevant for the article. Such a recommendation can be generated using one or more engines, as described herein.

Creative apparatus 508 also includes community engine 564 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 540. Community engine 564 stores any data corresponding to the community, such as work shared on the community and comments or likes received for the work as community data 566. Community data 566 also includes notification data and is used for notifying other users by the community engine in case of any activity related to the work or new work being shared. Community engine 564 works in conjunction with synchronization engine 532 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 564 and synchronization engine 532. In collaborative workflows, a plurality of users is assigned different tasks related to the work.

Creative apparatus 508 also includes marketplace engine 568 for providing marketplace to one or more users. Marketplace engine 568 enables the user to offer an asset for selling or using. Marketplace engine 568 has access to assets 540 that the user wants to offer on the marketplace. Creative apparatus 508 also includes search engine 570 to enable searching of assets 540 in the marketplace. Search engine 570 is also a part of one or more application programs 528 to enable the user to perform search for assets 540 or any other type of application program data 530. Search engine 570 can perform a search for an asset using metadata 542 or the file.

Creative apparatus 508 also includes document engine 572 for providing various document related workflows, including electronic or digital signature workflows, to the user. Document engine 572 can store documents as assets 540 in data storage unit 512 or can maintain a separate document repository (not shown in FIG. 5).

It is to be appreciated that the engines and working of the engines are described as examples herein, and the engines can be used for performing any step in providing digital experience to the user.

Exemplary Operating Environment

Figure 6:
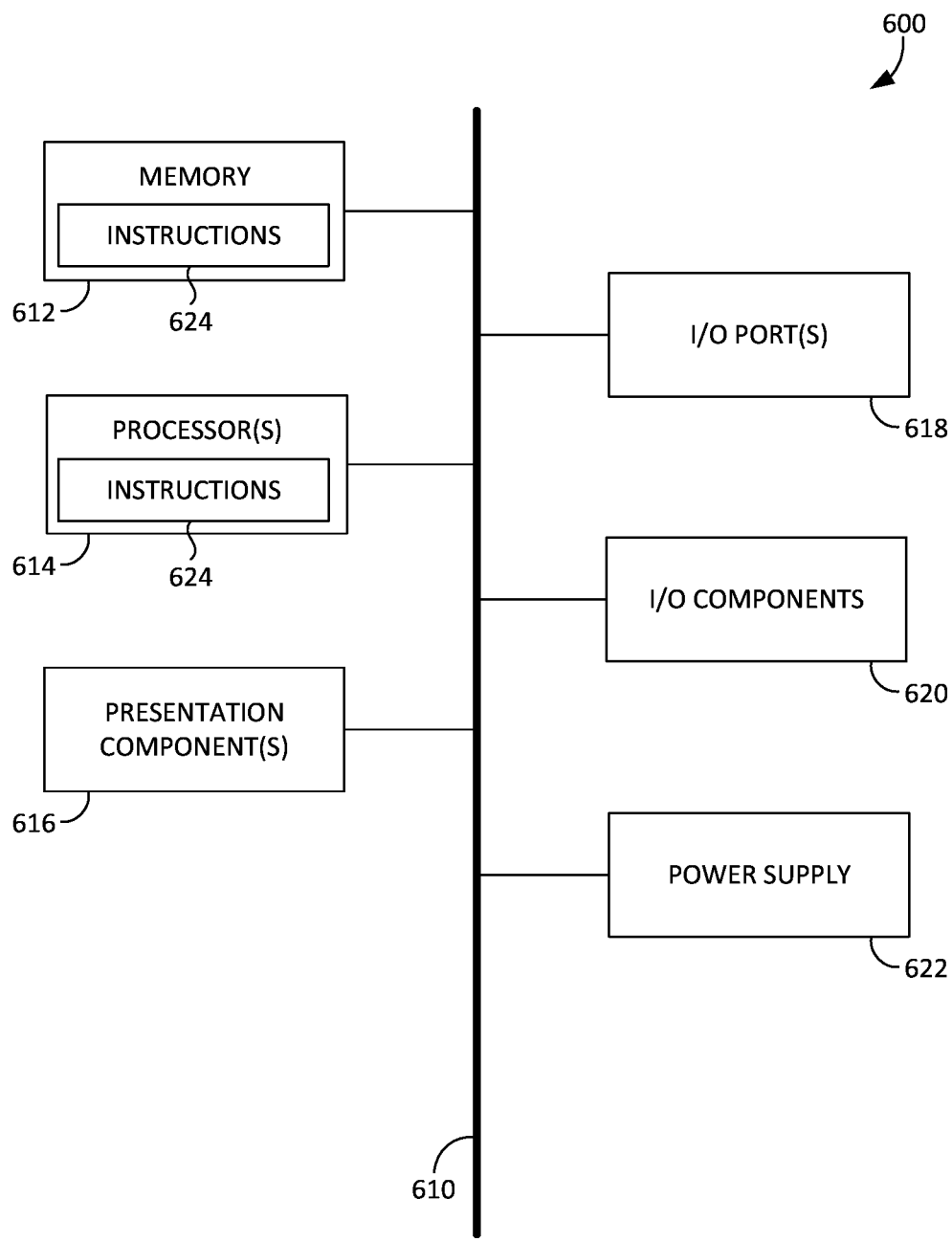
FIG. 6 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 600. Computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of computing device 600 to render immersive augmented reality or virtual reality.

Embodiments described herein support optimizing execution modes for user requests. The components described herein refer to integrated components of a self-training storage system. The integrated components refer to the hardware architecture and software framework that support functionality using the self-training storage system. The hardware architecture refers to physical components and interrelationships thereof and the software framework refers to software providing functionality that can be implemented with hardware embodied on a device.

The end-to-end software-based self-training storage system can operate within the self-training storage system components to operate computer hardware to provide self-training storage system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the self-training storage system components can manage resources and provide services for the self-training storage system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   receiving, at a server, a request from a requesting user;
   automatically generating a plurality of proposed execution modes based on a real-time evaluation of one or more request parameters associated with the request, wherein a first of the plurality of proposed execution modes is based on a history of historical execution modes used to process historical requests;
   automatically generating an ultimate execution mode for the request based on the plurality of proposed execution modes;
   storing the ultimate execution mode and the one or more request parameters in the history to generate an updated history;
   processing the request, with the server, using the ultimate execution mode; and
   automatically generating a future execution mode for a future request using the updated history.

2. The one or more computer storage media of claim 1, wherein at least one of the plurality of proposed execution modes is based on one or more user policies.

3. The one or more computer storage media of claim 1, at least one of the plurality of proposed execution modes is based on an instantaneous system load.

4. The one or more computer storage media of claim 1, wherein the first proposed execution mode is predicted by a first machine learning model trained using the history as training data.

5. The one or more computer storage media of claim 4, wherein the first machine learning model models the history using a regression equation.

6. The one or more computer storage media of claim 1, wherein the automatically generating of the ultimate execution mode comprises generating an encoded variate based on a weightage system that combines the proposed execution modes using associated weights.

7. The one or more computer storage media of claim 6, wherein the weights are determined by training a second machine learning model using a survey of user satisfaction with a determined execution mode as training data.

8. A computerized method for optimizing execution modes, the method comprising:
   receiving, at a server, a request from a requesting user;
   automatically generating a plurality of proposed execution modes based on a real-time evaluation of one or more request parameters associated with the request;
   automatically generating an ultimate execution mode by:
      encoding the proposed execution modes,
      generating an encoded variate using a weightage system that combines the proposed execution modes using associated weights, and
      decoding the variate to generate the ultimate execution mode; and
   processing the request, with the server, using the ultimate execution mode.

9. The computerized method of claim 8, wherein at least one of the plurality of proposed execution modes is based on one or more user policies.

10. The computerized method of claim 8, at least one of the plurality of proposed execution modes is based on an instantaneous system load.

11. The computerized method of claim 8, wherein a first of the plurality of proposed execution modes is additionally based on a history of historical execution modes used to process historical requests, and wherein the method additionally comprises:
   generating an updated history by storing the ultimate execution mode and the one or more request parameters in the history; and
   automatically generating a future execution mode for a future request using the updated history.

12. The computerized method of claim 11, wherein the first proposed execution mode is predicted by a first machine learning model trained using the history as training data.

13. The computerized method of claim 12, wherein the first machine learning model models the history using a regression equation.

14. The computerized method of claim 8, wherein the weights are determined by training a second machine learning model using a survey of user satisfaction with a determined execution mode as training data.

15. A computer system comprising:
   one or more hardware processors and memory configured to provide computer program instructions to the one or more hardware processors;
   a data storage unit comprising a history of historical execution modes used to process historical requests;
   an input component configured to access a request from a requesting user;
   a means for automatically generating a plurality of proposed execution modes based on a real-time evaluation of one or more request parameters associated with the request, wherein a first of the plurality of proposed execution modes is based on the history;
   a means for automatically generating an ultimate execution mode for the request by combining the proposed execution modes using a weightage system; and
   a request handler configured to store the ultimate execution mode and the one or more request parameters in the history to generate an updated history, and to process the request using the ultimate execution mode,
   wherein the means for automatically generating the plurality of proposed execution modes is additionally configured to automatically generate a future execution mode for a future request using the updated history.

16. The computer system of claim 15, wherein at least one of the plurality of proposed execution modes is based on an instantaneous system load.

17. The computer system of claim 15, wherein the means for automatically generating the plurality of proposed execution modes is additionally configured to predict the first proposed execution mode using a first machine learning model trained using the history as training data.

18. The computer system of claim 17, wherein the first machine learning model models the history using a regression equation.

19. The computer system of claim 15, wherein the means for automatically generating the ultimate execution mode is additionally configured to generate an encoded variate using the weightage system to combine the proposed execution modes using associated weights.

20. The computer system of claim 19, wherein the means for automatically generating the ultimate execution mode is additionally configured to determine the weights by training a second machine learning model using a survey of user satisfaction with a determined execution mode as training data.

* * * * *